United States Patent
Peng et al.

(10) Patent No.: US 11,792,335 B2
(45) Date of Patent: Oct. 17, 2023

(54) PROJECTION SYSTEM AND IMAGE PROJECTION METHOD

(71) Applicant: Coretronic Corporation, Hsin-Chu (TW)

(72) Inventors: Chien-Chun Peng, Hsin-Chu (TW); Hsun-Cheng Tu, Hsin-Chu (TW); Chi-Wei Lin, Hsin-Chu (TW); Chun-Lin Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 43 days.

(21) Appl. No.: 17/693,437

(22) Filed: Mar. 14, 2022

(65) Prior Publication Data

US 2022/0303407 A1    Sep. 22, 2022

(30) Foreign Application Priority Data

Mar. 17, 2021   (CN) .......................... 202110285052.8

(51) Int. Cl.
*G06T 7/70* (2017.01)
*G03B 21/60* (2014.01)
(Continued)

(52) U.S. Cl.
CPC ......... *H04N 1/00267* (2013.01); *G03B 21/60* (2013.01); *G06T 5/006* (2013.01);
(Continued)

(58) Field of Classification Search
None
See application file for complete search history.

(56) References Cited

U.S. PATENT DOCUMENTS

| | | | |
|---|---|---|---|
| 2004/0061838 A1 | 4/2004 | Mochizuki et al. | |
| 2009/0174868 A1 | 7/2009 | Matsuda | |
| 2011/0096394 A1* | 4/2011 | Liu .......................... | G06F 3/041 |
| | | | 345/173 |

FOREIGN PATENT DOCUMENTS

| | | |
|---|---|---|
| CN | 107274814 | 10/2017 |
| CN | 210776142 | 6/2020 |

(Continued)

OTHER PUBLICATIONS

"Search Report of Europe Counterpart Application", dated Jun. 9, 2022, p. 1-p. 12.

*Primary Examiner* — Bao-Luan Q Le
*Assistant Examiner* — Danell L Owens
(74) *Attorney, Agent, or Firm* — JCIPRNET

(57) ABSTRACT

A projection system, including a projection target, a projection device, an image capturing device, and a processor circuit, is provided. The projection target includes a reflective surface and an anti-reflective film disposed on the reflective surface. The anti-reflective film defines a projection range. The image capturing device captures a first captured image containing the projection target. The first captured image includes an image of the anti-reflective film. The processor circuit determines a position and a shape of the anti-reflective film in the first captured image according to the first captured image. The projection device projects a projection image on the projection target. The projection device adjusts the projection image according to the position and the shape of the anti-reflective film, and correspondingly adjusts the projection image to the projection range. In addition, an image projection method is also provided.

19 Claims, 7 Drawing Sheets

(51) Int. Cl.
*G06T 5/00* (2006.01)
*G06T 5/50* (2006.01)
*H04N 1/00* (2006.01)
*B66B 3/00* (2006.01)

(52) U.S. Cl.
CPC .................. *G06T 5/50* (2013.01); *G06T 7/70* (2017.01); *H04N 1/00259* (2013.01); *B66B 3/002* (2013.01)

(56) References Cited

FOREIGN PATENT DOCUMENTS

| | | |
|---|---|---|
| TW | I616100 | 2/2018 |
| TW | I695626 | 6/2020 |

\* cited by examiner

PROJECTION SYSTEM AND IMAGE PROJECTION METHOD

CROSS-REFERENCE TO RELATED APPLICATION

This application claims the priority benefit of China application serial no. 202110285052.8, filed on Mar. 17, 2021. The entirety of the above-mentioned patent application is hereby incorporated by reference herein and made a part of this specification.

BACKGROUND

Technical Field

This disclosure relates to a projection system and an image projection method, and in particular to a projection system and an image projection method capable of correspondingly adjusting a projection image to a projection range.

Description of Related Art

When a projection system is used in projection on an elevator door, although a projection region located on the elevator door has a film affixed to a surface of the elevator door to overcome the problem of a projected image being reflected by the metal surface, it makes the projection image be of poor quality or difficult to correct. An adjustment means for aligning the projection image to a specified position (such as the affixed film region) is to perform image distortion adjustment manually, which is quite inconvenient for a user. That is to say, current adjustment of the projection image on the elevator door is a manual adjustment means, and the deformed image cannot be adjusted automatically.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the invention were acknowledged by a person of ordinary skill in the art.

SUMMARY

This disclosure provides a projection system and an image projection method, which may automatically adjust a projection image into a projection range.

Other advantages of the disclosure can be further understood from technical features disclosed in the disclosure.

An embodiment of the disclosure provides a projection system, which includes a projection target, a projection device, an image capturing device, and a processor circuit. The projection target includes a reflective surface and an anti-reflective film disposed on the reflective surface. The anti-reflective film defines a projection range. The image capturing device captures a first captured image containing the projection target. The first captured image includes an image of the anti-reflective film. The processor circuit determines a position and a shape of the anti-reflective film in the first captured image according to the first captured image. The projection device projects a projection image on the projection target. The projection device adjusts the projection image according to the position and the shape of the anti-reflective film and correspondingly adjusts the projection image to the projection range.

Another embodiment of the disclosure provides an image projection method for a projection system. The projection system includes a projection device and an image capturing device. The image projection method includes the following steps. A first captured image having a projection target is captured through the image capturing device. The projection target includes a reflective surface and an anti-reflective film disposed on the reflective surface. The anti-reflective film defines a projection range. A position and a shape of the anti-reflective film in the first captured image are determined according to the first captured image. A projection image is projected on the projection target through the projection device. And the projection image is adjusted according to the position and the shape of the anti-reflective film, and the projection image is correspondingly adjusted to the projection range.

Based on the above, the embodiments of the disclosure have at least one of the following advantages. In the projection system and the image projection method of the embodiments of the disclosure, the position and the shape of the anti-reflective film in the first captured image are determined according to the first captured image, and the projection image may be automatically adjusted to the projection range correspondingly.

Other objectives, features and advantages of the present invention can be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

Figure 1:
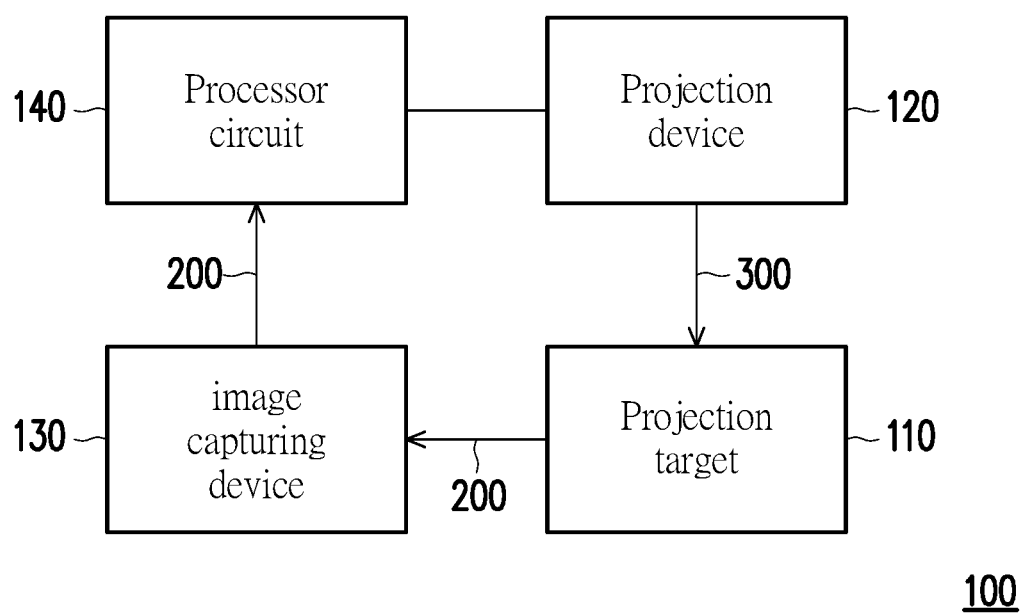
FIG. 1 is a schematic diagram of a projection system according to an embodiment of the disclosure.
Figure 2:
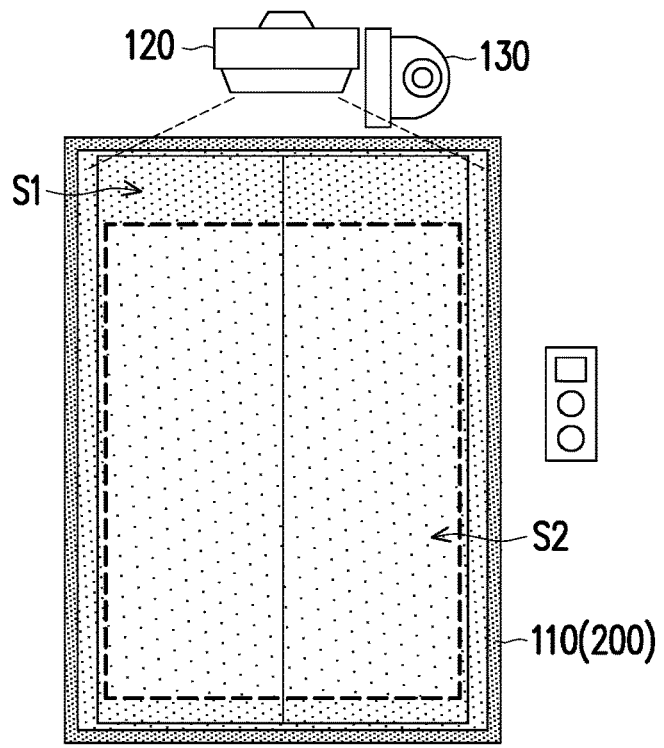
FIG. 2 is a schematic diagram of a projection device according to the embodiment in FIG. 1 before a projection image is projected to a projection target.
Figure 3:
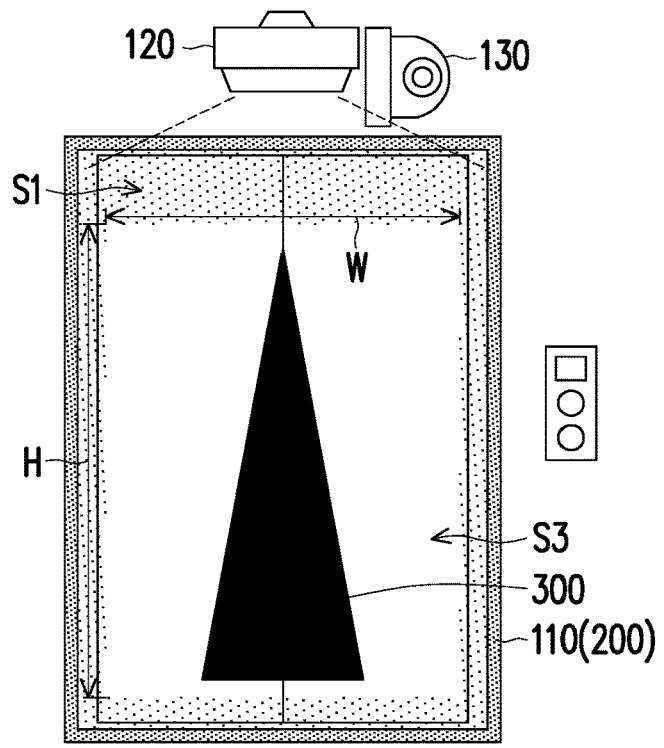
FIG. 3 is a schematic diagram of a projection device according to the embodiment in FIG. 1 after the projection image is projected on the projection target.

FIG. 1 is a schematic diagram of a projection system according to an embodiment of the disclosure. FIG. 2 is a schematic diagram of a projection device according to the embodiment in FIG. 1 before a projection image is projected to a projection target. FIG. 3 is a schematic diagram of the projection device according to the embodiment in FIG. 1 after the projection image is projected on the projection target.

With reference to FIGS. 1 to 3, a projection system 100 of the embodiment includes a projection target 110, a projection device 120, an image capturing device 130, and a processor circuit 140. The projection target 110 includes a reflective surface S1 and an anti-reflective film S2 affixed to the reflective surface S1. The anti-reflective film S2 defines a projection range S3. In the embodiment, the projection target 110 is, for example, a door of an elevator (shown in the figure). A metal surface of the door of the elevator serves as the reflective surface S1, and the anti-reflective film S2 is disposed onto the metal surface of the elevator. Therefore, an aspect ratio of the projection range S3 defined by the anti-reflective film S2 is less than one. That is, the projection range S3 is a rectangle with a width W smaller than a height H, and a direction of the height H is, for example, the direction of gravity, but the disclosure is not limited thereto. Type of the projection target 110 and a shape and a size of the projection range S3 are for illustration only, and are not intended to limit the disclosure.

The image capturing device 130 captures a first captured image 200. The first captured image 200 contains an image of the projection target 110 and the anti-reflective film S2. In the embodiment, a proportion of the image of the anti-reflective film S2 in the first captured image 200 is greater than 50%. In an embodiment, the proportion of the image of the anti-reflective film S2 in the first captured image 200 may also be approximately equal to 50%. In the embodiment, the projection device 120 does not project an image or projects a single-color image when the image capturing device 130 captures the first captured image 200. If the projection device 120 does not project any image, the first captured image contains an image of the anti-reflective film S2. If the projection device 120 projects the single-color image, the first captured image contains the single-color image projected on the anti-reflective film S2 by the projection device 120. The single-color image is, for example, a background image in black, red, blue, green, or white, and its color is not limited by the disclosure.

The processor circuit 140 determines a position and a shape of the anti-reflective film S2 in the first captured image 200 according to the first captured image 200. The projection device 120 projects a projection image 300 on the projection target 110. The projection device 120 adjusts the projection image 300 according to the position and the shape of the anti-reflective film S2 of the projection target 110, and correspondingly adjusts the projection image 300 to the projection range S3.

In an embodiment, the image capturing device 130 may be a camera disposed in the projection device 120 or a camera disposed outside the projection device 120. In an embodiment, the processor circuit 140 may be a chip circuit disposed in the projection device 120, or a chip circuit disposed in a host system, and the host system is a device outside the projection device 120. That is, the projection device 120 may include the image capturing device 130 and/or the processor circuit 140.

In the embodiment, the processor circuit 140 includes, for example, a central processing unit (CPU), a microprocessor, a digital signal processor (DSP), a programmable controller, a programmable logic device (PLD), or other similar devices, or a combination of the devices, but the disclosure is not limited thereto.

Figure 4A:
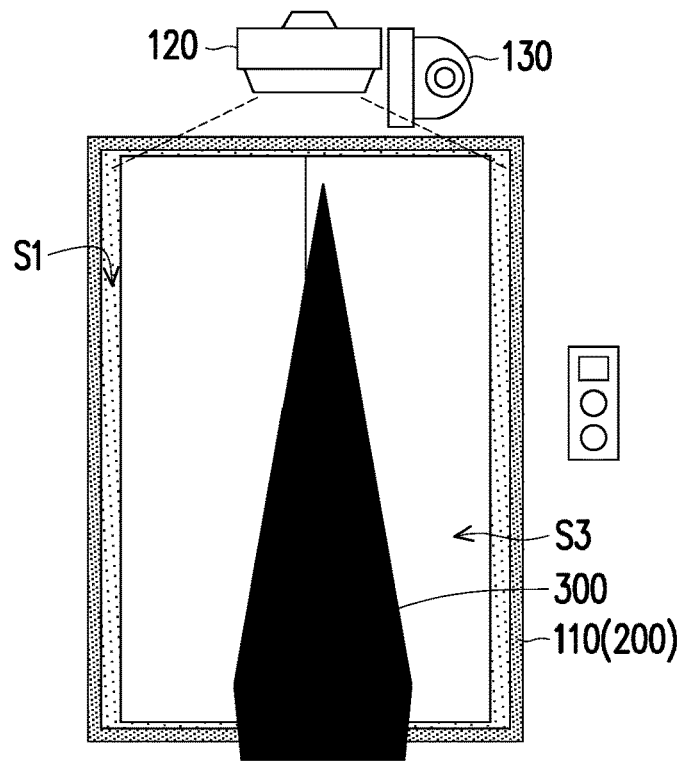
FIGS. 4A, 4B, 4C, 4D, 4E, and 4F are schematic flowcharts of the projection system correspondingly adjusting the projection image to the projection range according to an embodiment of the disclosure.
Figure 4B:
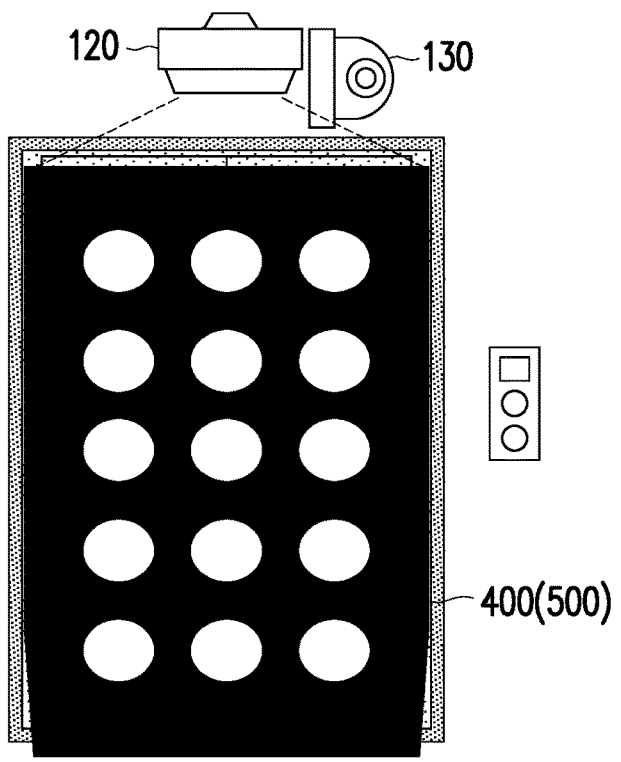

FIGS. 4A to 4F are schematic flowcharts of the projection system correspondingly adjusting the projection image to the projection range according to an embodiment of the invention. With reference to FIGS. 4A to 4F, in FIG. 4A, there may be a deformation of the projection image or a scenario in which projection image is beyond the projection range S3 when the unadjusted projection image 300 is projected on the projection target 110. In FIG. 4B, the projection device 120 projects a correction image 400 having a correction pattern, and the image capturing device 130 captures a second captured image 500 containing the correction image 400 projected on the projection range S3 (shown in FIG. 4A). At the same time, the processor circuit 140 determines coordinate conversion information of the projection device 120 and the image capturing device 130 according to the correction pattern of the correction image 400 in the second captured image 500. In the embodiment, the correction pattern is, for example, a dot grid pattern as shown in FIG. 4B, but content or arrangement of the pattern is not intended to limit the disclosure. In the embodiment, sufficient teachings, suggestions, and implementation descriptions of detailed steps of a method for determining the coordinate conversion information and implementation manners thereof may be obtained from common knowledge in the relevant technical field.

Figure 4C:
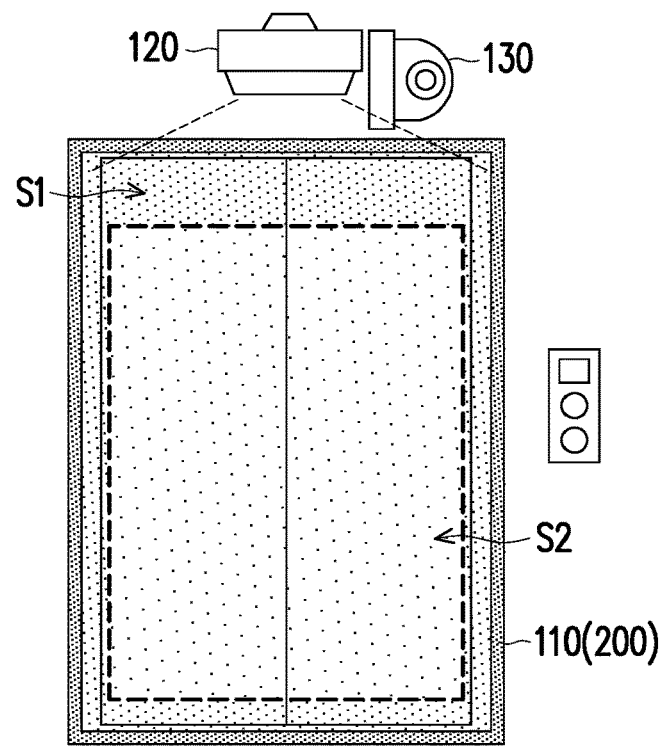
Figure 4D:
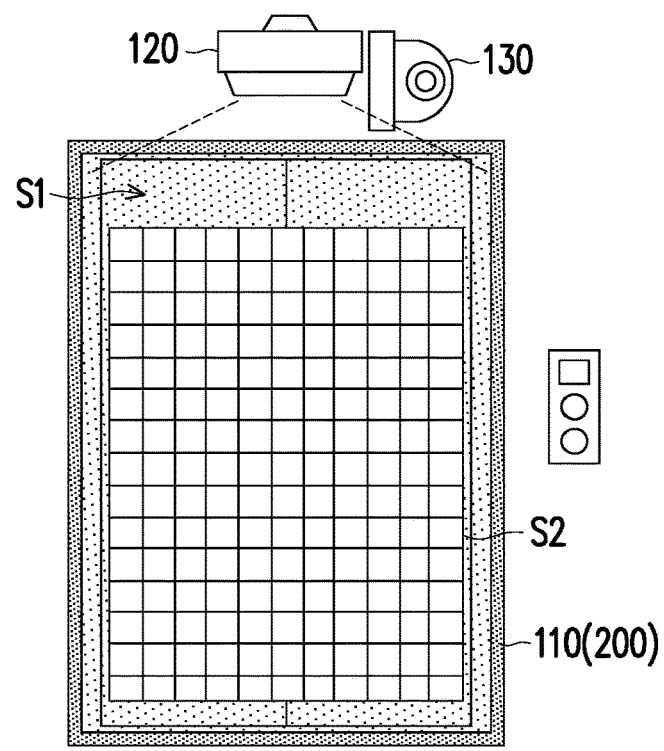

In FIG. 4C, the image capturing device 130 captures the first captured image 200. The first captured image 200 contains the images of the projection target 110 and the anti-reflective film S2. In the embodiment, the projection device 120 does not project any image on the projection target 110. In FIG. 4D, it is shown that image data of the first captured image 200 has a grayscale value range and/or a color value range corresponding to the anti-reflective film. The color value range is, for example, a color value range corresponding to the anti-reflective film expressed in HSL or HSV color space. HSL stands for hue, saturation, and lightness. HSV stands for hue, saturation, and value. The expression menas of the color value range in the disclosure is not limited thereto. Information such as the grayscale value range and/or the color value range corresponding to the anti-reflective film S2 may be pre-stored in the processor circuit 140.

In the embodiment, the processor circuit 140 determines the position and the shape of the anti-reflective film S2 in the first captured image 200 according to the grayscale value range corresponding to the anti-reflective film. Specifically, the processor circuit analyzes a grayscale value of image data of the first captured image 200, and obtains a difference between a grayscale value corresponding to the anti-reflective film S2 and a grayscale value corresponding to other ranges in the first captured image 200, so as to determine the position and shape of the anti-reflective film S2 in the first captured image 200. In an embodiment, the processor circuit 140 may also determine the position and the shape of the anti-reflective film S2 in the first captured image 200 according to the color value range corresponding to the anti-reflective film. In an embodiment, the processor circuit 140 may also determine the position and the shape of the anti-reflective film S2 in the first captured image 200 according to the grayscale value range and the color value range corresponding to the anti-reflective film at the same time.

Figure 4E:
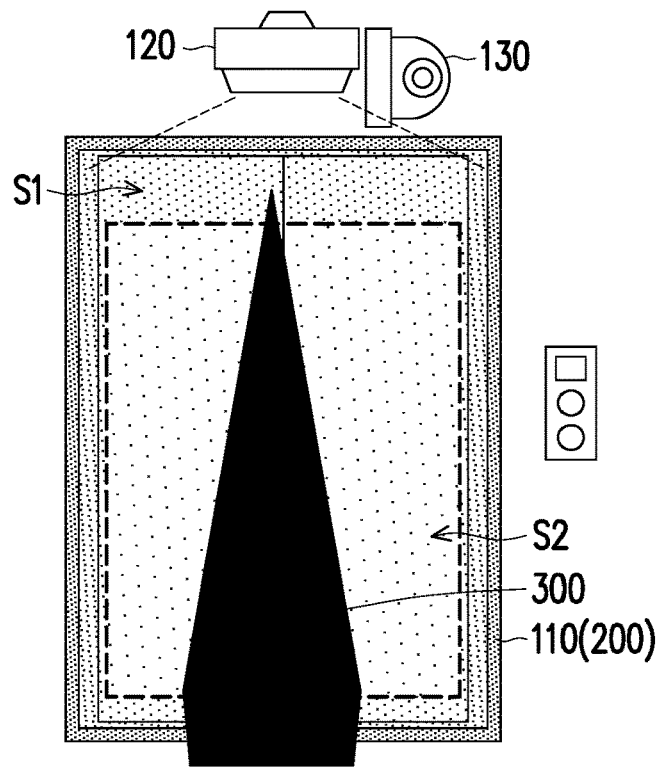
Figure 4F:
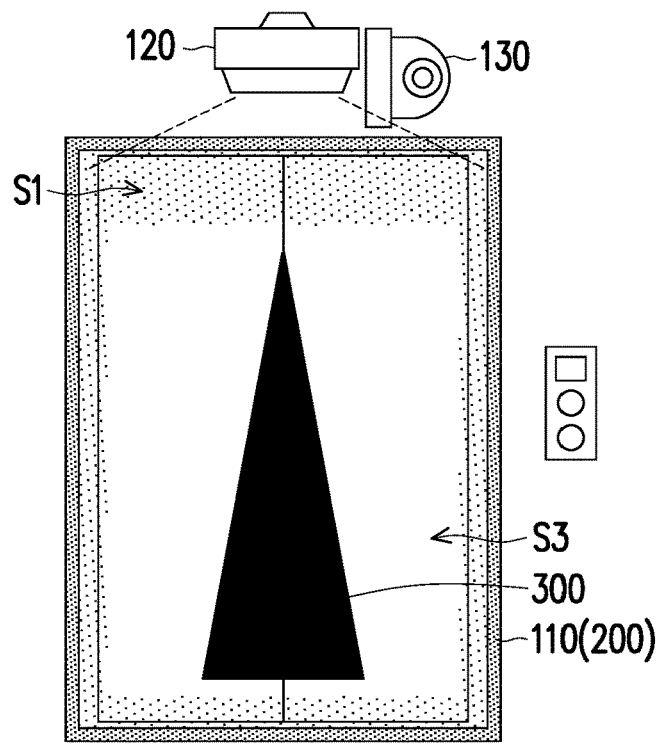

In FIG. 4E, it is shown that the projection device 120 projects the projection image 300 on the projection target 110. At the same time, the position and the shape of the anti-reflective film S2 have been determined according to analysis result by the processor circuit 140. Therefore, in FIG. 4F, the projection device 120 adjusts the projection image 300 according to the position and the shape of the anti-reflective film S2, and correspondingly adjusts the projection image 300 to the projection range S3.

Figure 5:
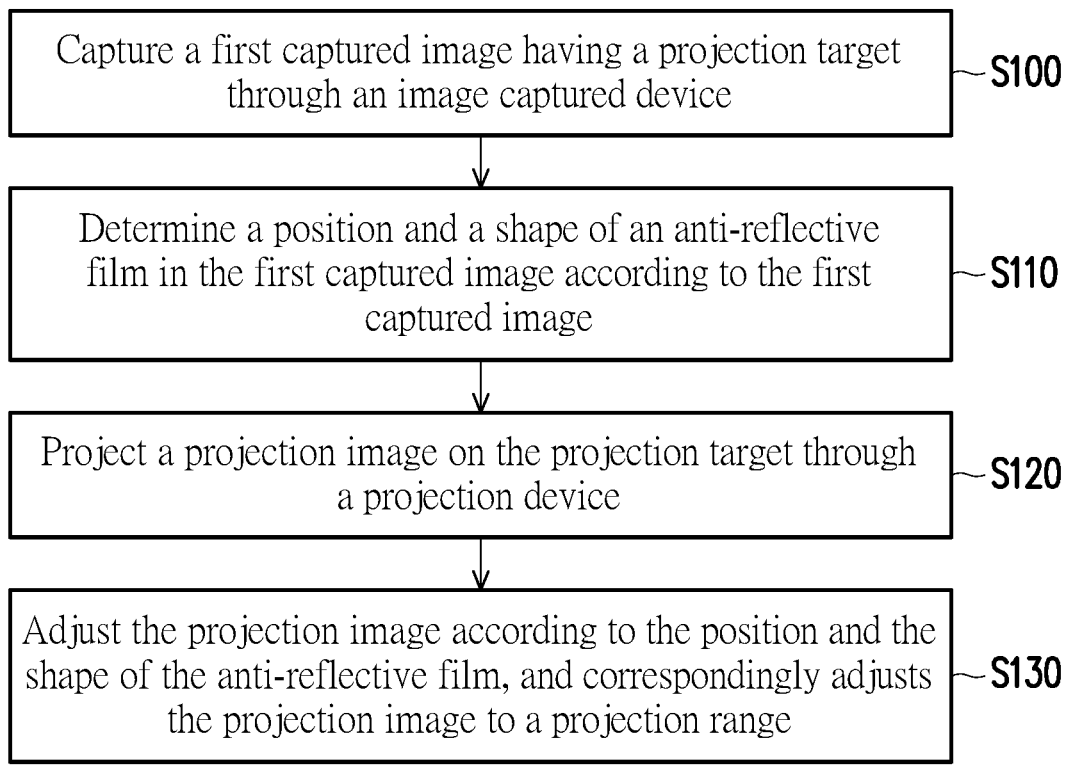
FIG. 5 is a flow chart of steps in an image projection method according to an embodiment of the disclosure.

FIG. 5 is a flow chart of steps in an image projection method according to an embodiment of the disclosure. With reference to FIGS. 1 and 5, the image projection method of the embodiment is at least used in the projection system 100 in FIG. 1. In Step S100, the projection system 100 captures the first captured image 200 having the projection target 110 through the image capturing device 130. In Step S110, the projection system 100 determines the position and the shape of the anti-reflective film S2 in the first captured image 200 according to the first captured image 200. In Step S120, the projection system 100 projects the projection image 300 on the projection target 110 through the projection device 120. In Step S130, the projection system 100 adjusts the projection image 300 according to the position and the shape of the anti-reflective film S2, and correspondingly adjusts the projection image 300 to the projection range S3. The projection range S3 is defined by, for example, the anti-reflective film S2.

In addition, sufficient teachings, suggestions, and implementation descriptions may be obtained from the description of the embodiment in FIGS. 1 to 4F for the image projection method according to the embodiment of the disclosure.

Figure 6:
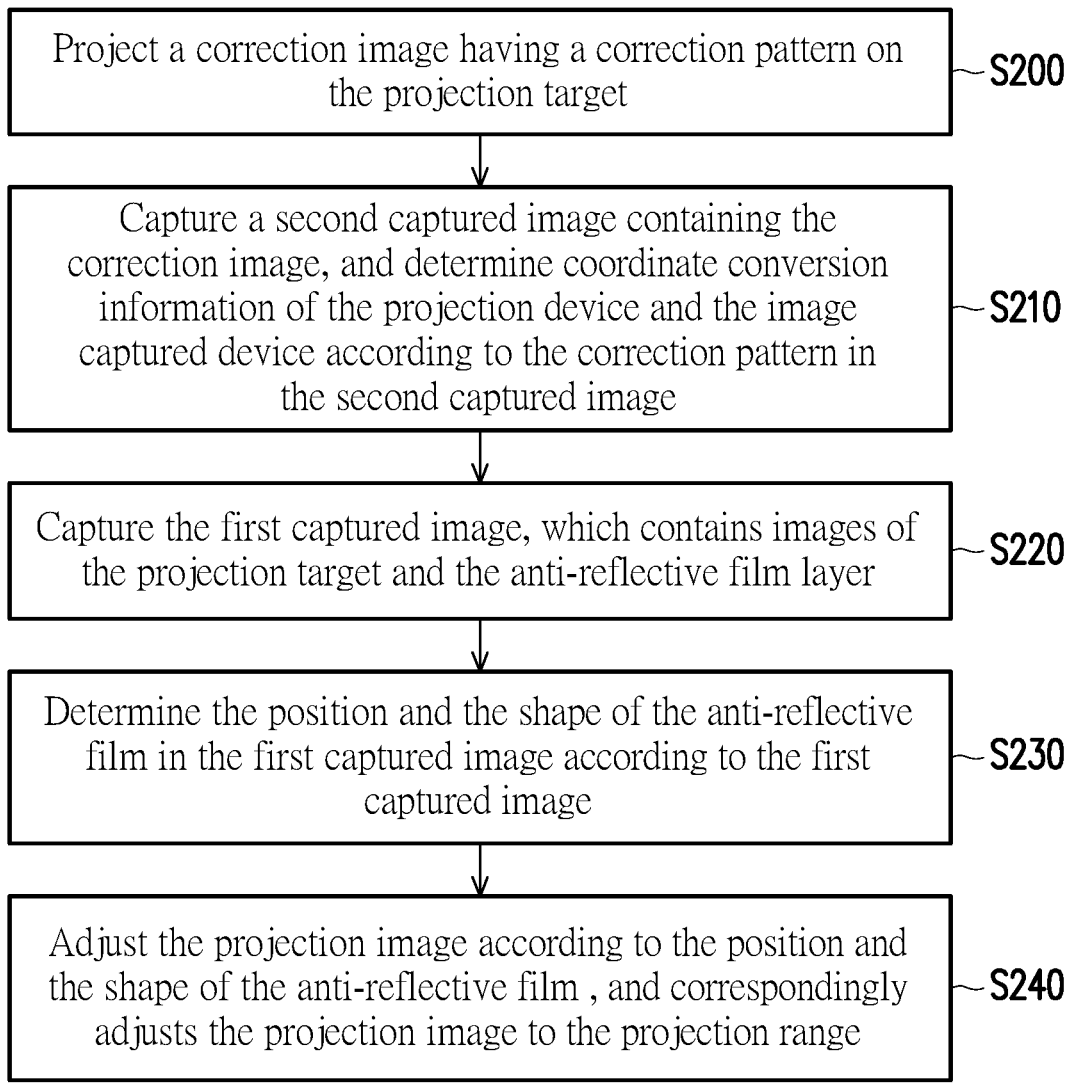
FIG. 6 is a flow chart of steps in an image projection method according to another embodiment of the disclosure.

FIG. 6 shows is flow chart of steps in an image projection method according to another embodiment of the disclosure. With reference to FIG. 1 and FIG. 6, the image projection method of the embodiment is at least used in the projection system 100 in FIG. 1. In Step S200, the projection device 120 projects the correction image 400 having the correction pattern on the projection target 110. In Step S210, the image capturing device 130 captures the second captured image 500 containing the correction image 400, and the processor circuit 140 determines the coordinate conversion information of the projection device 120 and the image capturing device 130 according to the correction pattern in the second captured image 500. In Step S220, the image capturing device 130 captures the first captured image 200, which contains the images of the projection target 110 and the anti-reflective film S2. In this step, the projection device 120 may not project any image. In Step S230, the processor circuit 140 determines the position and the shape of the anti-reflective film S2 in the first captured image 200 according to the first captured image 200. In Step S240, the projection device 120 adjusts the projection image 300 according to the position and the shape of the anti-reflective film S2, and correspondingly adjusts the projection image 300 to the projection range S3. The projection range S3 is defined by, for example, the anti-reflective film S2.

In addition, sufficient teachings, suggestions, and implementation descriptions may be obtained from the description of the embodiment in FIGS. 1 to 5 for the image projection method according to the embodiment of the disclosure.

In summary, the embodiments of the disclosure have at least one of the following advantages. In the embodiments of the disclosure, the reflective surface of the projection target may reflect the projection image, making it difficult to display the image. Therefore, by affixing the anti-reflective film on the reflective surface of the projection target, the sharpness and contrast of the image can be improved. In addition, a projection image with less reflection or scattering can be obtained when capturing the captured image containing the projection target through the image capturing device. The processor circuit determines the position and the shape of the anti-reflective film in the captured image according to the captured image, so that the projection device automatically adjusts the projection image according to the position and the shape of the anti-reflective film and correspondingly adjusts the projection image to the projection range.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby enabling persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the terms "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the invention is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising a projection target, a projection device, an image capturing device, and a processor circuit, wherein the projection target comprises a reflective surface and an anti-reflective film disposed on the reflective surface, and the anti-reflective film defines a projection range, the image capturing device captures a first captured image, wherein the first captured image comprises an image of the projection target and the anti-reflective film, and the processor circuit determines a position and a shape of the anti-reflective film in the first captured image according to the first captured image, the projection device projects a projection image on the projection target, the projection device adjusts the projection image according to the position and the shape of the anti-reflective film, and correspondingly adjusts the projection image to the projection range.

2. The projection system according to claim 1, wherein the projection device projects a correction image having a correction pattern, the image capturing device captures a second captured image containing the correction image, and the processor circuit determines coordinate conversion information of the projection device and the image capturing device according to the correction pattern in the second captured image.

3. The projection system according to claim 2, wherein the projection device further adjusts the projection image according to the coordinate conversion information and correspondingly adjusts the projection image to the projection range.

4. The projection system according to claim 1, wherein image data of the first captured image has a grayscale value range and/or a color value range corresponding to the anti-reflective film, and the processor circuit determines the position and the shape of the anti-reflective film in the first captured image according to the grayscale value range and/or the color value range corresponding to the anti-reflective film.

5. The projection system according to claim 4, wherein the processor circuit analyzes a grayscale value and/or a color value of the image data of the first captured image and compares with the grayscale value range and/or the color value range corresponding to the anti-reflective film, so as to determine the position and the shape of the anti-reflective film in the first captured image.

6. The projection system according to claim 1, wherein a proportion of the image of the anti-reflective film in the first captured image is greater than or equal to 50%.

7. The projection system according to claim 1, wherein the projection target comprises a metal surface of an elevator, the metal surface of the elevator serves as the reflective surface, and the anti-reflective film is affixed to the metal surface of the elevator.

8. The projection system according to claim 1, wherein an aspect ratio of the projection range is less than one.

9. The projection system according to claim 1, wherein the projection device comprises the image capturing device and/or the processor circuit.

10. The projection system according to claim 1, wherein the projection device does not project an image or the projection device projects a single-color image when the image capturing device captures the first captured image containing the projection target.

11. An image projection method, used in a projection system, wherein the projection system comprises a projection device and an image capturing device, the image projection method comprising steps of:
  capturing a first captured image through the image capturing device, wherein the first captured image contains an image of a projection target, the projection target comprises a reflective surface and an anti-reflective film disposed on the reflective surface, and the anti-reflective film defines a projection range;
  determining a position and a shape of the anti-reflective film in the first captured image according to the first captured image;
  project a projection image on the projection target through the projection device; and
  adjusting the projection image according to the position and the shape of the anti-reflective film, and correspondingly adjusting the projection image to the projection range.

12. The image projection method according to claim 11, further comprising:
  projecting a correction image having a correction pattern through the projection device;
  capturing a second captured image comprising the correction image through the image capturing device; and
  determining coordinate conversion information of the projection device and the image capturing device according to the correction pattern in the second captured image.

13. The image projection method according to claim 12, wherein the step of adjusting the projection image according to the position and the shape of the anti-reflective film in the first captured image, and adjusting the projection image to the projection range further comprises adjusting the projection image according to the coordinate conversion information, and correspondingly adjusting the projection image to the projection range.

14. The image projection method according to claim 11, wherein image data of the first captured image has a grayscale value range and/or a color value range corresponding to the anti-reflective film, and the step of determining a position and a shape of the anti-reflective film in the first captured image according to the first captured image further comprises determining the position and the shape of the anti-reflective film in the first captured image according to the grayscale value range and/or the color value range corresponding to the anti-reflective film.

15. The image projection method according to claim 14, wherein the step of determination of the position and the shape of the anti-reflective film in the first captured image according to the first captured image comprises analyzing a grayscale value and/or a color value of the image data of the first captured image, and comparing with the grayscale value range and/or the color value range corresponding to the anti-reflective film, so as to determine the position and the shape of the anti-reflective film in the first captured image.

16. The image projection method according to claim 11, wherein a proportion of an image of the anti-reflective film in the first captured image is greater than or equal to 50%.

17. The image projection method according to claim 11, wherein the projection target comprises a metal surface of an elevator, the metal surface of the elevator serves as the reflective surface, and the anti-reflective film is affixed to the metal surface of the elevator.

18. The image projection method according to claim 11, wherein an aspect ratio of the projection range is less than one.

19. The image projection method according to claim 11, wherein the step of capturing of the first captured image containing the projection target through the image capturing device comprises the projection device not projecting an image or the projection device projecting a single-color image.

* * * * *